United States Patent
Taki et al.

(10) Patent No.: US 10,189,664 B1
(45) Date of Patent: Jan. 29, 2019

(54) SHEET PROCESSING APPARATUS AND IMAGE FORMING SYSTEM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Hiroyuki Taki, Shizuoka (JP); Hiroyuki Tsuchihashi, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/903,789

(22) Filed: Feb. 23, 2018

(51) Int. Cl.
| | |
|---|---|
| *B65H 9/10* | (2006.01) |
| *B65H 37/04* | (2006.01) |
| *H04N 1/00* | (2006.01) |
| *B65H 29/12* | (2006.01) |
| *B65H 9/00* | (2006.01) |
| *B65H 31/34* | (2006.01) |

(52) U.S. Cl.
CPC ............ *B65H 9/101* (2013.01); *B65H 9/004* (2013.01); *B65H 29/125* (2013.01); *B65H 31/34* (2013.01); *B65H 37/04* (2013.01); *H04N 1/00631* (2013.01); *B65H 2301/163* (2013.01)

(58) Field of Classification Search
CPC ... B65H 7/00; B65H 7/20; B65H 9/00; B65H 9/004; B65H 9/006; B65H 9/10; B65H 9/101; B65H 9/103; B65H 9/106; B65H 29/26; B65H 29/34; B65H 31/34; B65H 37/04; B65H 2301/163; B65H 2404/653; B65H 2404/654; B65H 2408/121
See application file for complete search history.

(56) References Cited

U.S. PATENT DOCUMENTS

| | | | | |
|---|---|---|---|---|
| 5,385,340 | A * | 1/1995 | Hiroi | .................. B42C 1/12 270/58.13 |
| 6,905,118 | B2 | 6/2005 | Yamada et al. | |
| 2008/0187383 | A1* | 8/2008 | Yamamoto | ............ B65H 9/101 399/410 |
| 2011/0215523 | A1* | 9/2011 | Tsuji | ..................... B65H 31/00 271/226 |
| 2017/0313539 | A1 | 11/2017 | Taki | |
| 2017/0322508 | A1 | 11/2017 | Taki | |

FOREIGN PATENT DOCUMENTS

JP         2007-145545 A       6/2007

* cited by examiner

*Primary Examiner* — Prasad V Gokhale
(74) *Attorney, Agent, or Firm* — Foley & Lardner LLP

(57) ABSTRACT

A sheet processing apparatus includes a tray, a stapler, a first discharge section, and a controller. A sheet on which an image is formed is stacked on the tray. The stapler is arranged at an upstream side in a first direction which is a sheet discharge direction with respect to the tray, and executes a binding processing on the sheet. The first discharge section moves from a reference position at the upstream side of the tray to the first direction while supporting the sheet, and executes a discharge processing of the sheet. The controller enables the first discharge section to move from the reference position to a downstream side in the first direction and stop at a processing position and drives the stapler to execute the binding processing on the sheet supported by the first discharge section.

16 Claims, 11 Drawing Sheets

SHEET PROCESSING APPARATUS AND IMAGE FORMING SYSTEM

FIELD

Embodiments described herein relate generally to a sheet processing apparatus and an image forming system.

BACKGROUND

A sheet processing apparatus executes a post-processing such as sorting and stapling on a sheet-like image receiving medium (hereinafter, referred to as a "sheet") conveyed from an image forming apparatus. The sheet processing apparatus includes a standby section, a processing section, and a discharge section. The standby section temporarily retains the sheet. The standby section sends the retained sheet to the processing section at a prescribed timing. The processing section executes the post-processing by aligning the sheet received from the standby section. The processing section discharges the sheet subjected to the post-processing to the discharge section.

The processing section executes a stapling processing at a standard position of the sheet. The standard position is located at an inner side with respect to an end of the sheet by a predetermined distance.

DETAILED DESCRIPTION

In accordance with an embodiment, a sheet processing apparatus comprises a tray, a binding section, a first discharge section, and a controller. A sheet on which an image is formed is stacked on the tray. The binding section is arranged at an upstream side in a first direction which is a sheet discharge direction with respect to the tray, and executes a binding processing on the sheet. The first discharge section moves from a reference position at the upstream side of the tray to the first direction while supporting the sheet, and executes a discharge processing of the sheet. The controller enables the first discharge section to move from the reference position to a downstream side in the first direction and stop at a processing position and drives the binding section to execute the binding processing on the sheet supported by the first discharge section.

Hereinafter, a sheet processing apparatus according to an embodiment is described with reference to the accompanying drawings.

In the present application, XYZ directions are defined as follows. The X direction and the Y direction are parallel to a sheet placing surface in a processing tray. The X direction (first direction) is a discharge direction of the sheet placed on the processing tray, and +X direction is a downstream side in the discharge direction. The Y direction (second direction) is a width direction of the sheet placed on the processing tray, and is orthogonal to the X direction. The Z direction is a normal direction of the sheet placing surface in the processing tray, and +Z direction is an upward direction.

Figure 1:
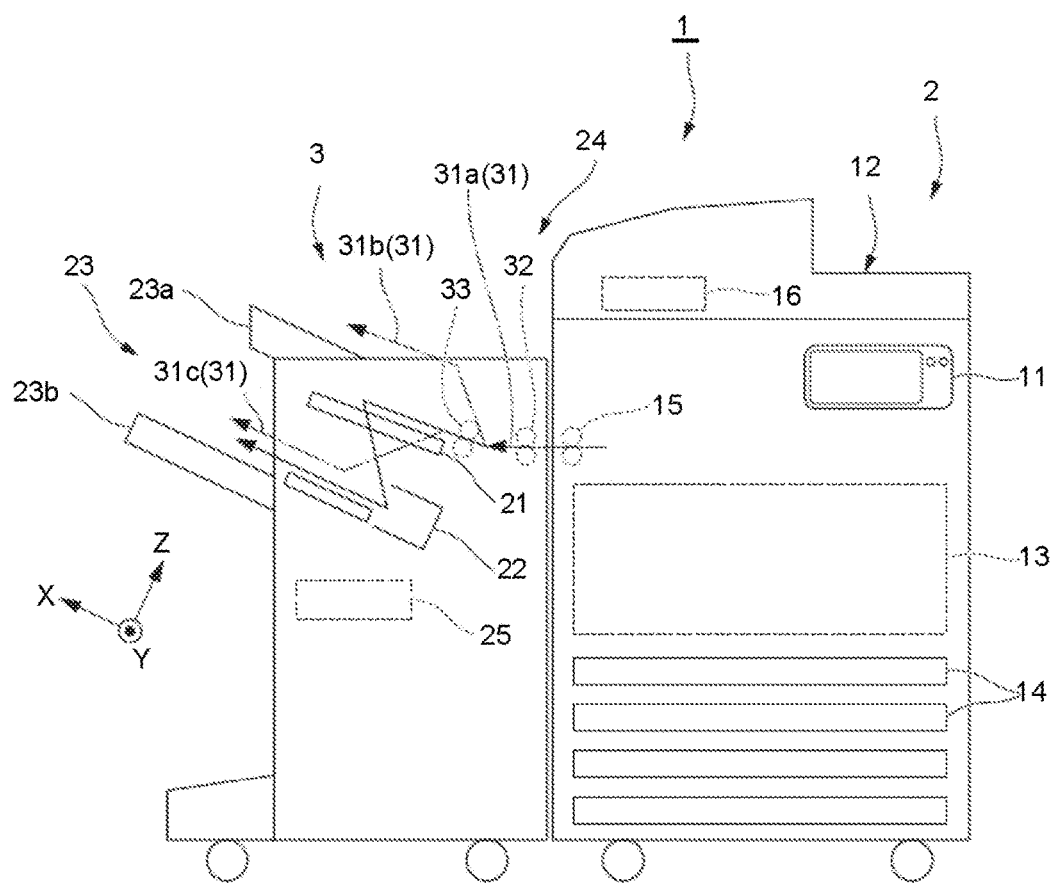
FIG. 1 is a diagram schematically exemplifying an overall arrangement of an image forming system according to an embodiment.
Figure 2:
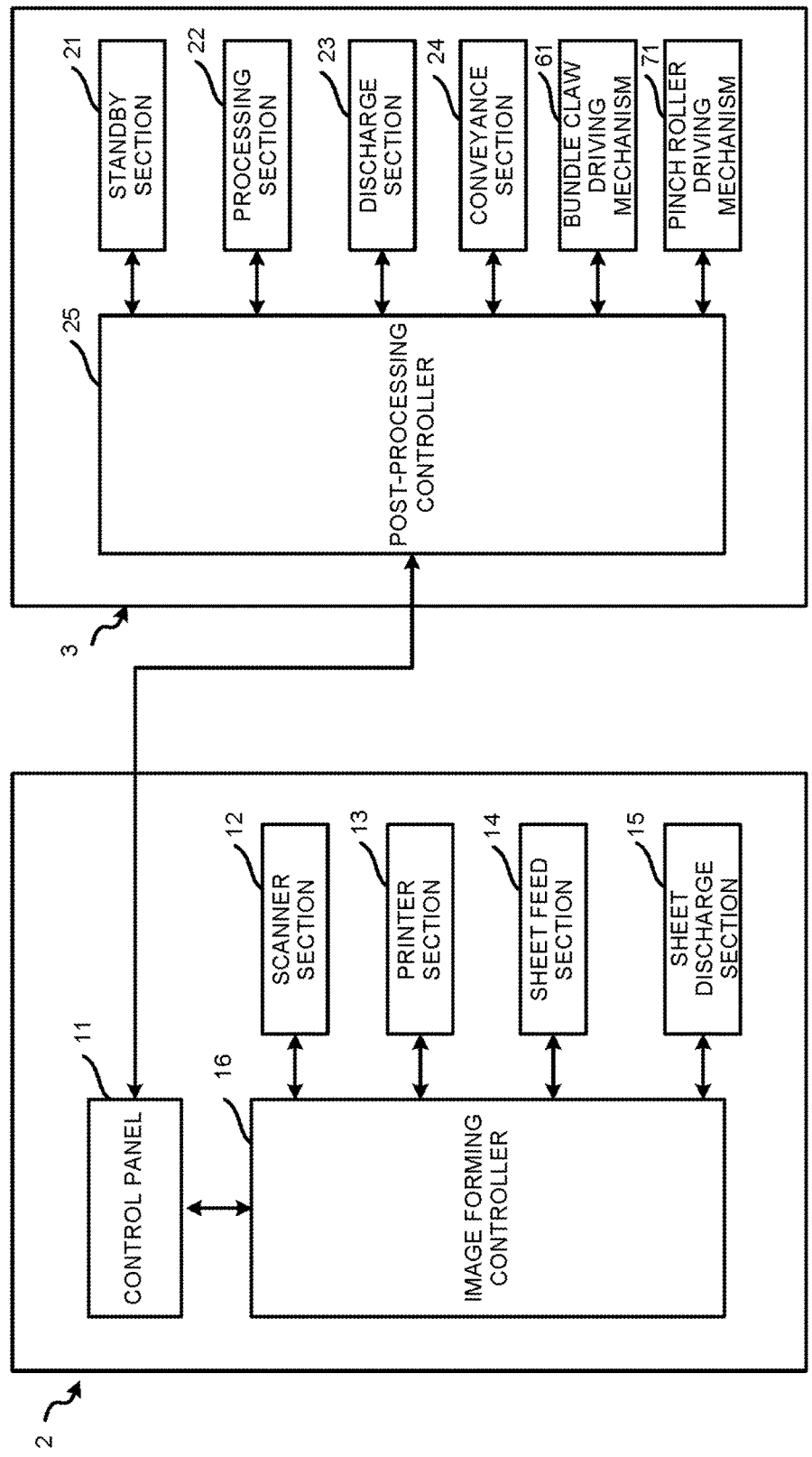
FIG. 2 is a block diagram exemplifying the functional components of an image forming apparatus and a sheet processing apparatus according to an embodiment.

FIG. 1 is a diagram schematically exemplifying an overall arrangement of an image forming system 1 according to an embodiment. FIG. 2 is a block diagram exemplifying the functional components of an image forming apparatus 2 and a sheet processing apparatus 3 according to an embodiment.

The image forming system 1 is provided with the image forming apparatus 2 and the sheet processing apparatus 3. The image forming apparatus 2 forms an image on a sheet-like medium (hereinafter, collectively referred to as a "sheet S") such as a paper. The sheet processing apparatus 3 executes a post-processing on the sheet S discharged from the image forming apparatus 2.

The image forming apparatus 2 includes a control panel 11, a scanner section 12, a printer section 13, a sheet feed section 14, a sheet discharge section 15 and an image forming controller 16.

The control panel 11 includes an operation section, a display section and a panel controller. The operation section receives an operation by a user. For example, the operation section includes various keys and a touch panel. The display section displays various information. The panel controller controls reception of an operation of the user by the operation section and display on the display section. The panel controller includes a control circuit having a CPU (Central Processing Unit), a ROM (Read Only Memory), and a RAM (Random Access Memory).

For example, the control panel 11 receives an input relating to the type of the post-processing carried out on the sheet S. The control panel 11 receives a selection of any one of a plurality of different processing modes. The plurality of different processing modes includes a sort mode, a stapling mode and a non-sort mode. The sort mode refers to a processing mode in which a sorting processing is executed. The stapling mode refers to a processing mode in which a binding processing (stapling processing) by a staple is executed. The non-sort mode refers to a processing mode in which the execution of the sorting processing and the stapling processing is prohibited. For example, in a case of receiving the selection of the stapling mode, the control panel 11 receives an input relating to the number of sheets S (the number of staples) forming a sheet bundle SS.

The image forming apparatus 2 sends information relating to the post-processing received by the control panel 11 to the sheet processing apparatus 3.

The scanner section 12 includes a reading section and a scanner controller. The reading section reads image information of a copy object as intensity of light. The scanner controller controls reading of the image information by the reading section. The scanner controller includes a control circuit having a CPU, a ROM, and a RAM. The scanner section 12 sends the read image information to the printer section 13.

The printer section 13 forms an output image (hereinafter, referred to as a "toner image") with a developer such as a toner based on the image information received from the scanner section 12 or an external device. The printer section 13 transfers the toner image onto the surface of the sheet S. The printer section 13 applies heat and pressure to the toner image on the surface of the sheet S to fix the toner image on the sheet S. The printer section 13 sends the sheet S on which the toner image is fixed to the sheet discharge section 15. The printer section 13 includes a printer controller. The printer controller includes a control circuit having a CPU, a ROM, and a RAM. The printer controller controls the printing of the image on the sheet S by the printer section 13.

The sheet feed section 14 supplies the sheets S one by one to the printer section 13 in accordance with a timing at which the printer section 13 forms the toner image. For example, the sheet feed section 14 includes a plurality of the sheet feed cassettes. Each of the sheet feed cassettes accommodates a sheet S of a predetermined size and type in advance. Each of the sheet feed cassettes has a pickup roller. Each pickup roller picks up the sheets S one by one from each of the sheet feed cassettes. Each pickup roller sends the sheet S taken out from each of the sheet feed cassettes to the printer section 13.

The sheet discharge section 15 conveys the sheet S received from the printer section 13 to the sheet processing apparatus 3.

The image forming controller 16 controls operations of the image forming apparatus 2. The image forming controller 16 controls the control panel 11, the scanner section 12, the printer section 13, the sheet feed section 14 and the sheet discharge section 15. The image forming controller 16 includes, for example, a CPU, a ROM and a RAM.

The sheet processing apparatus 3 is arranged adjacent to the image forming apparatus 2. The sheet processing apparatus 3 executes the post-processing designated via the control panel 11 on the sheet S conveyed from the image forming apparatus 2. For example, the post-processing may include the sorting processing and the stapling processing.

The sheet processing apparatus 3 includes a standby section 21, a processing section 22, a discharge section 23, a conveyance section 24, a post-processing controller 25, a bundle claw driving mechanism 61, and a pinch roller driving mechanism 71.

The standby section 21 temporarily retains the sheet S received from the image forming apparatus 2. For example, a plurality of succeeding sheets S stands by on the standby section 21 while the post-processing is executed on the former sheet S by the processing section 22. The standby section 21 is arranged above the processing section 22 in a vertical direction. A plurality of sheets S overlaps in a thickness direction and stands by on the standby section 21. If the processing section 22 is in a state capable of receiving the sheet S, the standby section 21 drops the sheet S that is being retained towards the processing section 22.

The processing section 22 carries out the post-processing on the sheet S received from the standby section 21. For example, the processing section 22 carries out the sorting processing for gathering a plurality of sheets S and aligning them. For example, the processing section 22 carries out the binding processing (stapling processing) with a staple on the sheet bundle SS formed by gathering a plurality of sheets S. The processing section 22 discharges the sheet S on which the post-processing is carried out to the discharge section 23.

The discharge section 23 supports the sheet S received from the standby section 21 and the processing section 22. The discharge section 23 includes a fixed tray 23a and a movable tray 23b. For example, the fixed tray 23a is arranged at the upper part of the sheet processing apparatus 3. For example, the movable tray 23b is arranged at the side of the sheet processing apparatus 3. The movable tray 23b moves in an upper and lower direction along the side of the sheet processing apparatus 3. For example, the upper and lower direction is the vertical direction. The fixed tray 23a and the movable tray 23b support the sheet S received from the standby section 21 and the processing section 22.

The conveyance section 24 includes a conveyance path 31, an inlet roller mechanism 32, and an outlet roller mechanism 33.

The conveyance path 31 is provided inside the sheet processing apparatus 3. The conveyance path 31 guides the sheet S received from the image forming apparatus 2 to the standby section 21, the processing section 22, or the discharge section 23. As shown in FIG. 1, the conveyance path 31 includes a first conveyance path 31a, a second conveyance path 31b and a third conveyance path 31c which bifurcate from the first conveyance path 31a. The first conveyance path 31a guides the sheet S to the standby section 21 if the sort mode or the stapling mode is selected. The second conveyance path 31b guides the sheet S to the fixed tray 23a if the fixed tray 23a of the discharge section 23 is selected as the discharge destination of the sheet S in the non-sort mode. The third conveyance path 31c guides the sheet S directly to the processing section 22 if the movable tray 23b of the discharge section 23 is selected as the discharge destination of the sheet S in the non-sort mode. The third conveyance path 31c may enable the sheet S to pass through the standby section 21 without retaining the sheet S in the standby section 21, when guiding the sheet S directly to the processing section 22.

The inlet roller mechanism 32 is arranged between the upstream end of the conveyance path 31 in the sheet conveyance direction and the sheet discharge section 15 of the image forming apparatus 2. The inlet roller mechanism 32 sends the sheet S received from the image forming apparatus 2 to the conveyance path 31.

The outlet roller mechanism 33 is arranged between the downstream end of the first conveyance path 31a in the sheet conveyance direction and the standby section 21. The outlet roller mechanism 33 sends the sheet S received from the first conveyance path 31a to the standby section 21.

The post-processing controller 25 controls the whole operations of the sheet processing apparatus 3. The post-processing controller 25 controls the standby section 21, the processing section 22, the discharge section 23, the conveyance section 24, the bundle claw driving mechanism 61, and the pinch roller driving mechanism 71. The post-processing controller 25 includes a control circuit having a CPU, a ROM, and a RAM.

Details of the structure of the sheet processing apparatus 3 are described below.

Figure 3:
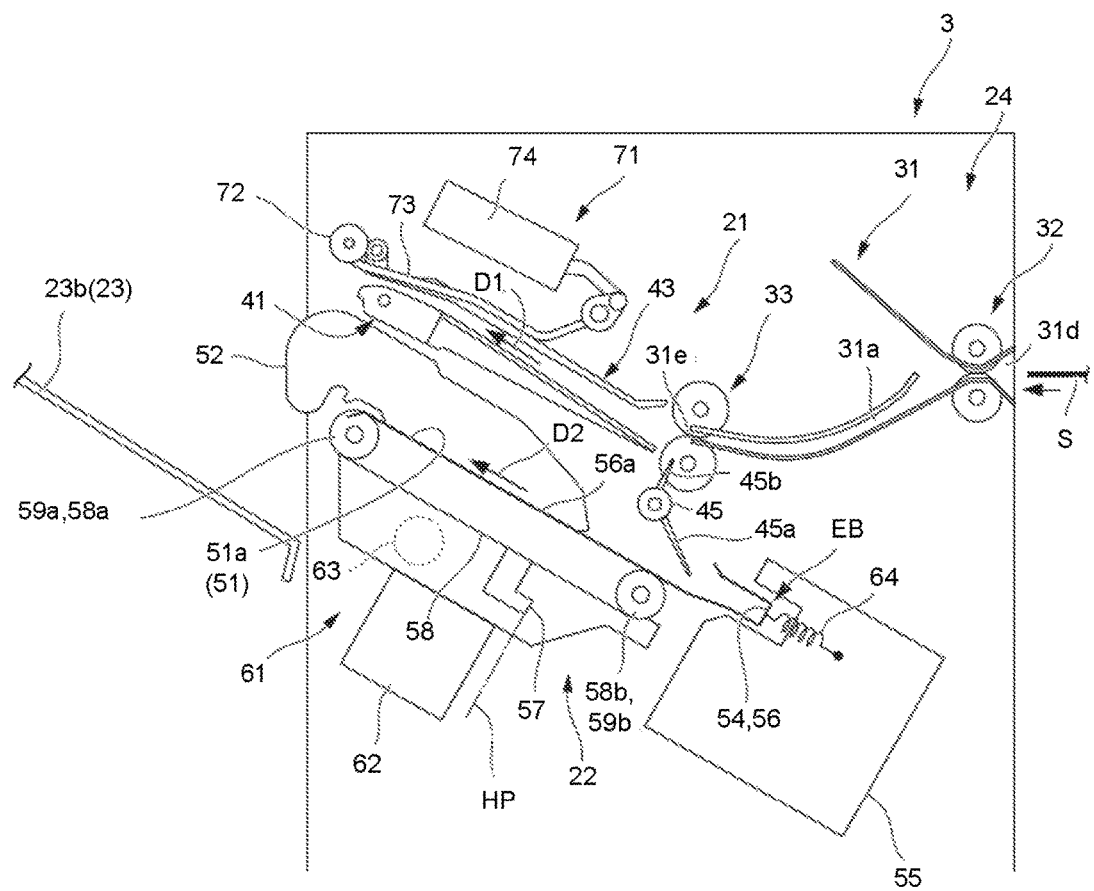
FIG. 3 is a side view schematically exemplifying an arrangement of a sheet processing apparatus according to an embodiment.

FIG. 3 is a side view schematically exemplifying an arrangement of a sheet processing apparatus 3 according to an embodiment.

The conveyance section 24 includes the conveyance path 31 where a sheet supply port 31d and a sheet discharge port 31e are formed. The sheet supply port 31d is formed to face the sheet discharge section 15 of the image forming apparatus 2 at the upstream end of the conveyance path 31 in the sheet conveyance direction. The sheet S discharged from the image forming apparatus 2 is sent to the conveyance path 31 through the sheet supply port 31d. The sheet discharge port 31e is formed to face the standby section 21 at the downstream end of the first conveyance path 31a in the sheet conveyance direction. The sheet S passing through the first conveyance path 31a is sent to the standby section 21 through the sheet discharge port 31e.

The standby section 21 includes a standby tray 41, an assist guide 43, and a paddle section (first alignment section) 45. The sheet conveyance direction in the standby section 21 is indicated by a first arrow D1 shown in FIG. 3. The direction of the first arrow D1 is an entry direction of the sheet S from the outlet roller mechanism 33 to the standby tray 41.

The standby tray 41 includes a pair of tray members moving in mutually opposite directions in the sheet width direction. The sheet width direction is parallel to a plane of the sheet S and perpendicular to the sheet conveyance direction. The pair of the tray members moves towards each other to support the sheet S if the sheet S stands by on the standby tray 41. In a case of moving the sheet S from the standby tray 41 to the processing section 22, the pair of the tray members moves away from each other to release the support of the sheet S. The pair of the tray members drops the sheet S towards the processing section 22 by moving away from each other and releasing the support of the sheet S.

The assist guide 43 is arranged above the standby tray 41 in the vertical direction. For example, the length of the assist guide 43 in the sheet conveyance direction is formed to be the same as that of the standby tray 41 in the sheet conveyance direction. The assist guide 43 presses the sheet S towards the processing section 22 in a case of moving the sheet S from the standby tray 41 to the processing section 22. The assist guide 43 has a swing shaft parallel to the sheet width direction at the downstream end of the sheet conveyance direction. The assist guide 43 swings the upstream end of the sheet conveyance direction around the swing shaft. The assist guide 43 swings the upstream end of the sheet conveyance direction downwards to press it against the sheet S in a case of pressing the sheet S towards the processing section 22.

The paddle section 45 is arranged between the upstream end of the standby tray 41 and the processing section 22. The paddle section 45 includes a rotating body having a rotation axis parallel to the Y direction and paddles 45a and 45b radially extending from the rotating body. For example, the paddles 45a and 45b are formed into a flat plate shape by an elastic material such as rubber and have flexibility. The paddle section 45 has a plurality of paddles 45a and 45b each having different lengths from the rotation axis to a tip thereof. The plurality of paddles 45a and 45b include long paddles 45a each having a longer length from the rotation axis to the tip and short paddles 45b each having a shorter length. For example, the paddle section 45 rotates in a counterclockwise direction shown in FIG. 3. The short paddle 45b hits the sheet S from the above to drop it at the time of moving the sheet S from the standby tray 41 to the processing section 22. The long paddle 45a moves the sheet S falling down to the processing section 22 towards the end of the processing section 22 in the −X direction. The long paddle 45a and the short paddle 45b enable the sheet S to contact with the end of the processing section 22 in the −X direction to align the position of the sheet S in the X direction. The paddle section 45 aligns (so-called longitudinal alignment) the position of the sheet S in the X direction in the processing section 22.

The paddle section 45, together with conveyance rollers 59a and 59b and a rear end stopper 54 of the processing section 22 described later, forms a longitudinal alignment device which performs the longitudinal alignment of the sheet S in the sheet conveyance direction.

The processing section 22 includes a processing tray (tray) 51, a pair of horizontal alignment plates (second alignment section) 52, the rear end stopper 54, a stapler (binding section) 55, an ejector (first discharge section) 56, a thruster 56a, a bundle claw (second discharge section) 57, a bundle claw belt 58, and conveyance rollers 59a and 59b. The sheet conveyance direction in the processing section 22 is indicated by a second arrow D2 shown in FIG. 3. The direction of the second arrow D2 is a discharge direction of the sheet S from the processing tray 51.

The processing tray 51 is arranged below the standby tray 41 in the vertical direction. The processing tray 51 is tilted with respect to a horizontal direction in such a manner that the processing tray 51 at the +X side gradually becomes higher upwards in the vertical direction than the −X side as it goes from the −X side to the +X side. For example, the processing tray 51 is arranged in parallel with the standby tray 41. The processing tray 51 includes a conveyance surface 51a on which the sheet S is placed. The conveyance surface 51a supports the sheet S.

The pair of the horizontal alignment plates 52 is arranged away from each other in the Y direction at the conveyance surface 51a of the processing tray 51. The pair of the horizontal alignment plates 52 moves in mutually opposite directions in the Y direction. The pair of the horizontal alignment plates 52 aligns the positions of both ends in the Y direction of the sheet S by moving towards each other and sandwiching the sheet S from both sides in the Y direction. The pair of the horizontal alignment plates 52 aligns the position of the sheet S in the Y direction (so-called a horizontal alignment). The pair of the horizontal alignment plates 52 moves away from each other at the time of releasing the clamping of the sheet S.

The rear end stopper 54 is arranged at the end in the −X direction of the processing tray 51. For example, the shape of the rear end stopper 54 may be a hook shape. The rear end stopper 54 supports an end in the −X direction of the sheet S placed on the processing tray 51.

The stapler 55 is a binding section which executes the binding processing with the staple on the sheet bundle SS formed by aligning a plurality of the sheets S. The stapler 55 is arranged at the rear side of the end in the −X direction of the processing tray 51. A plurality of the sheets S is supported by the rear end stopper 54 and the positions of the rear ends thereof are aligned, and then the rear ends of the plurality of the sheets are tightened by the stapler 55 to be fixed. If the stapling mode is selected, the stapler 55 executes the stapling processing on the sheet bundle SS, which is supported by the rear end stopper 54 and of which the rear end thereof is aligned.

The ejector 56 is arranged at the upstream end of the processing tray 51 in the sheet conveyance direction. The ejector 56 is arranged so as to overlap with the rear end stopper 54 if viewed from the Y direction at a reference position EB. The ejector 56 may be arranged in the −X direction with respect to the rear end stopper 54 at the reference position EB. For example, the shape of the ejector 56 may be a hook shape. The ejector 56 supports the end in the −X direction of the sheet bundle SS subjected to the stapling processing and the sorting processing.

The ejector 56 moves to the +X direction with respect to the processing tray 51. For example, the ejector 56 moves in the +X direction from the reference position EB by a driving force transmitted from a driving source. The ejector 56 is energized towards the reference position EB by an energization member 64 such as a spring or the like. For example, if the ejector 56 is disconnected from the driving source, the ejector 56 moves to the reference position EB by a returning force in the −X direction given from the energization member 64.

The ejector 56 moves from the −X side to the +X side while supporting the sheet bundle SS and moves the sheet bundle SS in the +X direction. The ejector 56 moves the end of the sheet bundle SS in the −X direction to a position where the sheet bundle SS is delivered to the bundle claw 57.

The thruster 56a is arranged along the conveyance surface 51a. For example, the shape of the thruster 56a is a plate shape. The thruster 56a moves in the +X direction together with the ejector 56. If the ejector 56 is located at the reference position EB, the thruster 56a is arranged in the −X direction with respect to the first conveyance roller 59a. If the ejector 56 moves to the +X direction from the reference position EB, the tip of the thruster 56a in the +X direction projects towards the +X direction with respect to the first conveyance roller 59a. The thruster 56a protrudes towards the +X direction with respect to the first conveyance roller 59a so as to extend the conveyance surface 51a towards the +X direction. The thruster 56a contacts with the lower surface of the sheet S protruding towards the +X direction with respect to the first conveyance roller 59a to support the sheet S.

The bundle claw 57 is an extruding member that presses the sheet bundle SS on the processing tray 51 in the +X direction to move the sheet bundle SS. The bundle claw 57 is fixed to the bundle claw belt 58. For example, the shape of the bundle claw 57 is the hook shape. The bundle claw belt 58 is wound around a pair of the first belt roller 58a and the second belt roller 58b which are arranged apart from each other in the X direction of the processing tray 51. The first belt roller 58a is arranged in the +X direction with respect to the second belt roller 58b. The first belt roller 58a is a driving roller and rotationally drives the bundle claw belt 58. The second belt roller 58b is a driven roller and is driven to rotate by a rotational driving force transmitted from the first belt roller 58a via the bundle claw belt 58.

The bundle claw 57 moves as the bundle claw belt 58 rotates. The bundle claw 57 contacts with the end in the −X direction of the sheet bundle SS placed on the processing tray 51 and conveys the sheet bundle SS in such a manner that it pushes the sheet bundle SS towards the +X direction. The bundle claw 57 stands by at a position in the +X direction with respect to the second belt roller 58b as a home position HP at the lower surface side of the processing tray 51. Whether the bundle claw 57 is present at the home position HP is detected by a sensor.

For example, the bundle claw 57 moves from the home position HP towards the second belt roller 58b at the lower surface side of the processing tray 51 as the bundle claw belt 58 rotates in a normal direction. The normal rotation of the bundle claw belt 58 is counterclockwise rotation as shown in FIG. 3. The bundle claw 57 moves along the outer periphery of the second belt roller 58b from the lower surface side to the upper surface side of the processing tray 51. The upper surface side of the processing tray 51 is the conveyance surface 51a side. At the upper surface side of the processing tray 51, the bundle claw 57 receives the sheet bundle SS from the ejector 56 and moves in the +X direction. The bundle claw 57 moves along the outer periphery of the first belt roller 58a towards the lower surface side of the processing tray 51 while conveying the sheet bundle SS. The bundle claw 57 pushes the sheet bundle SS in the +X direction to discharge the sheet bundle SS.

For example, the bundle claw 57 moves in the −X direction at the upper surface side of the processing tray 51 as the bundle claw belt 58 rotates reversely after the discharge of the sheet bundle SS. The bundle claw 57 moves along the outer periphery of the second belt roller 58b from the upper surface side to the lower surface side of the processing tray 51 to return to the home position HP. The bundle claw 57 can return to the home position HP by the normal rotation of the bundle claw belt 58.

The bundle claw belt 58, the first belt roller 58a and the second belt roller 58b make up the bundle claw driving mechanism 61 driving the bundle claw 57.

The bundle claw driving mechanism 61 is provided with a bundle claw driving motor (motor) 62. For example, the bundle claw driving motor 62 is a driving source for the first belt roller 58a, the ejector 56, and the thruster 56a. The bundle claw driving motor 62 is always connected to the first belt roller 58a. The bundle claw driving motor 62 is connected to the ejector 56 and the thruster 56a via an electromagnetic clutch (clutch) 63.

The electromagnetic clutch 63 transmits the driving force of the bundle claw driving motor 62 to the ejector 56 and the thruster 56a at the time of ON (connection). The electromagnetic clutch 63 interrupts the transmission of the driving force of the bundle claw driving motor 62 to the ejector 56 and the thruster 56a at the time of OFF (disconnection). For example, the bundle claw driving motor 62 rotates the bundle claw belt 58 counterclockwise or clockwise as shown in FIG. 3 at the time the electromagnetic clutch 63 is turned on. The bundle claw driving motor 62 moves the ejector 56 and the thruster 56a in the +X direction from the reference position EB at the time of rotationally driving the bundle claw belt 58 counterclockwise.

The first conveyance roller 59a is arranged so as to overlap with the first belt roller 58a if viewed from the sheet width direction. The second the conveyance roller 59b is arranged so as to overlap with the second belt roller 58b if viewed from the sheet width direction.

The conveyance rollers 59a and 59b align the position of the end in the −X direction of the sheet S placed on the processing tray 51. The conveyance rollers 59a and 59b function as longitudinal alignment rollers for aligning the position of the sheet S in the X direction. The conveyance rollers 59a and 59b, together with the paddle section 45 and the rear end stopper 54, make up a longitudinal aligning device for performing the longitudinal alignment of the sheet S. For example, the conveyance rollers 59a and 59b rotate clockwise as shown in FIG. 3 to convey the sheet S placed on the processing tray 51 towards the rear end stopper 54. The conveyance rollers 59a and 59b cooperate with the paddle section 45 to perform the longitudinal alignment of the sheet S by enabling the rear end of the sheet S to abut against the rear end stopper 54.

The conveyance rollers 59a and 59b convey the sheet S placed on the processing tray 51 towards the movable tray 23b of the discharge section 23. For example, the conveyance rollers 59a and 59b rotate counterclockwise as shown in FIG. 3 to convey the sheet S in the +X direction. The conveyance rollers 59a and 59b apply a driving force to the sheet S placed on the processing tray 51 by contacting with the sheet S from the below. The first conveyance roller 59a can sandwich the sheet S in a nip between the first conveyance roller 59a and a pinch roller 72 which is moved to a rotational position by the pinch roller driving mechanism 71 to apply the driving force to the sheet S.

The pinch roller driving mechanism 71 includes a support arm 73 that supports the pinch roller 72 and a solenoid 74 that drives the support arm 73.

The pinch roller 72 is a driven roller having no driving source. The pinch roller 72 moves between a standby position at the upper side in the vertical direction with respect to the standby tray 41 and a rotational position close to the first conveyance roller 59a at the lower side in the vertical direction with respect to the standby position. The pinch roller 72 at the rotational position and the first conveyance roller 59a are opposed to each other in a radial direction with their rotation axes parallel to each other. The pinch roller 72 at the rotational position sandwiches the sheet S with the first conveyance roller 59a and is driven to rotate by the rotational driving force of the first conveyance roller 59a transmitted via the sheet S.

The support arm 73 supports the pinch roller 72 at the tip thereof. The support arm 73 has a swing shaft parallel to the Y direction at a base end thereof. The support arm 73 rotates around the swing shaft and swings the pinch roller 72 between the standby position and the rotational position.

The solenoid 74 is connected to the base end of the support arm 73. The solenoid 74 causes a plunger to protrude or immerse and rotates the support arm 73. The solenoid 74 moves the pinch roller 72 between the standby position and the rotational position via the support arm 73.

The post-processing controller (controller) 25 controls the operations of the standby section 21 and the processing section 22 to execute a sheet processing method described below.

Figure 4:
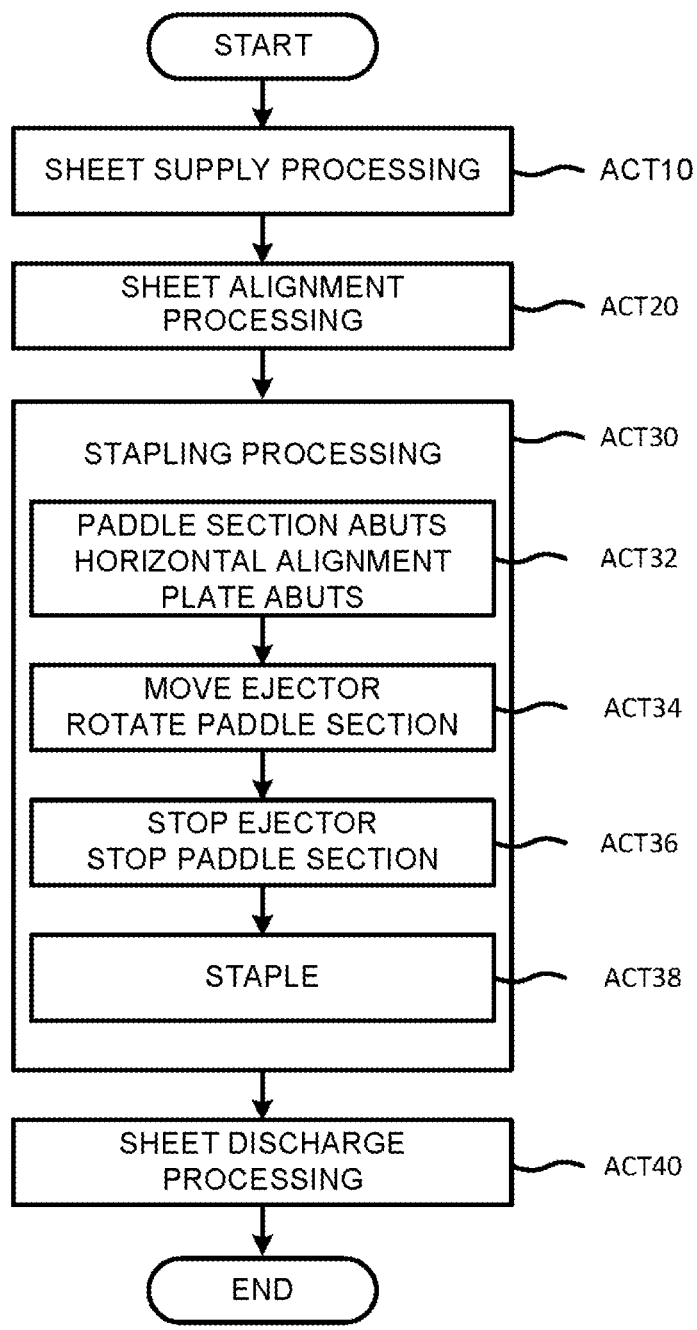
FIG. 4 is a flowchart illustrating the flow of a sheet processing method according to an embodiment.

FIG. 4 is a flowchart illustrating the flow of the sheet processing method according to an embodiment. The sheet processing method includes a sheet supply processing (ACT 10), a sheet alignment processing (ACT 20), the stapling processing (ACT 30), and a sheet discharge processing (ACT 40).

Figure 9:
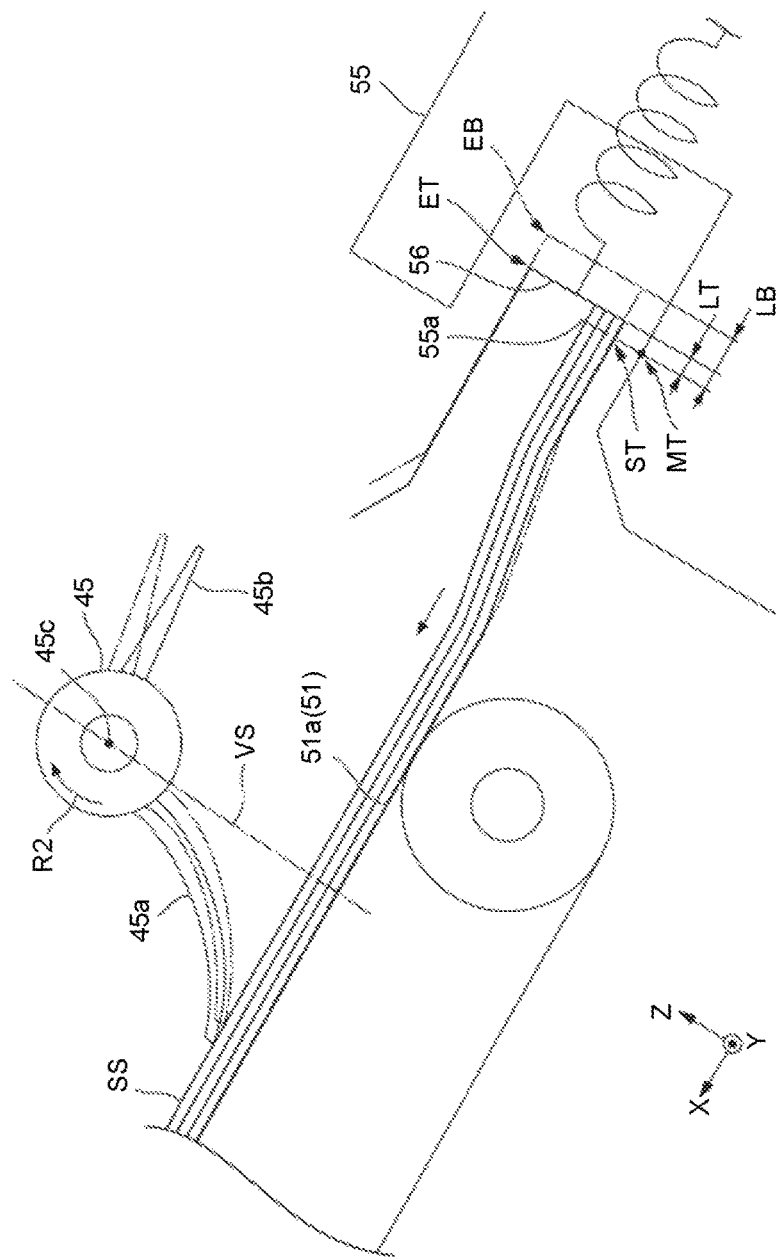
FIG. 9 is an enlarged view of an IX portion in FIG. 7.

The control panel 11 of the image forming apparatus 2 receives the selection of the stapling mode. The control panel 11 receives input of the number of sheets to be subjected to the stapling processing. The control panel 11 receives an input of a stapling position where the stapling processing is executed in the sheet bundle SS. As shown in FIG. 9, a stapling position ST is defined as a position away from the end in the −X direction by a distance LT in the sheet bundle SS. The stapling position ST is the same as a stapling standard position SB (refer to FIG. 6) or in the −X direction with respect to the stapling standard position SB. The stapling standard position SB is a position where the stapling processing is executed (a staple 55a is driven in) in the sheet bundle SS immediately after the completion of the sheet alignment processing. The stapling standard position SB is defined as a position away from the end in the −X direction by a distance LB in the sheet bundle SS. The maximum value of the distance LT of the stapling position ST is the distance LB of the stapling standard position SB. The distance LT of the stapling position ST is set to a value greater than 0 and equal to or smaller than the maximum value LB. In the following description, a value larger than 0 and smaller than the maximum value LB is set as the distance LT of the stapling position ST. The image forming controller 16 outputs selection information of the stapling mode, information of the number of sheets to be subjected to the stapling processing, and information of the stapling position ST to the post-processing controller 25.

The post-processing controller 25 executes the sheet supply processing (ACT 10).

Figure 5:
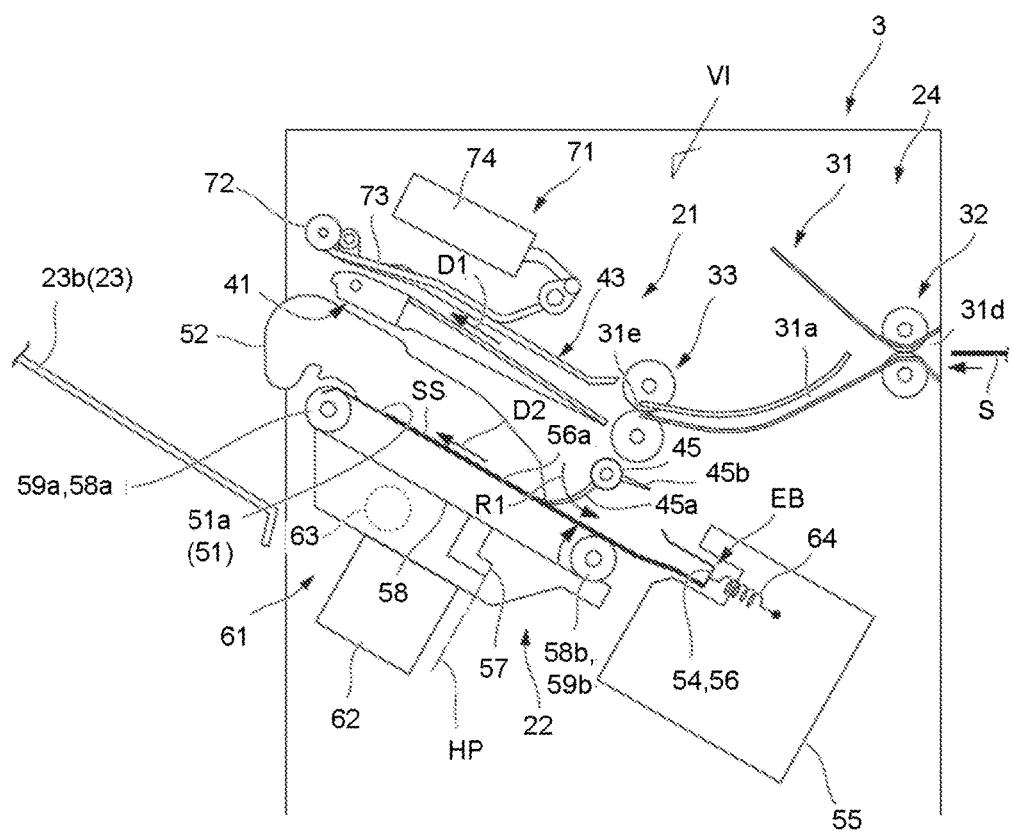
FIG. 5 is a side view illustrating an operation state of a sheet alignment processing in a sheet processing apparatus according to an embodiment.
Figure 5:
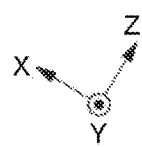

The post-processing controller 25 determines whether a predetermined number of the sheets S to be subjected to the stapling processing are stacked on the standby tray 41. If the determination is Yes, the post-processing controller 25 releases the support of the sheet bundle SS by the standby tray 41 by moving the pair of tray members in the standby tray 41 away from each other. The post-processing controller 25 swings the assist guide 43 to press the −X side of the sheet bundle SS towards the processing section 22. The post-processing controller 25 rotates the paddle section 45 counterclockwise as shown in FIG. 5 to press the −X side of the sheet bundle SS towards the processing section 22 with the short paddle 45b. As a result, the sheet bundle SS falls to the processing tray 51.

Figure 6:
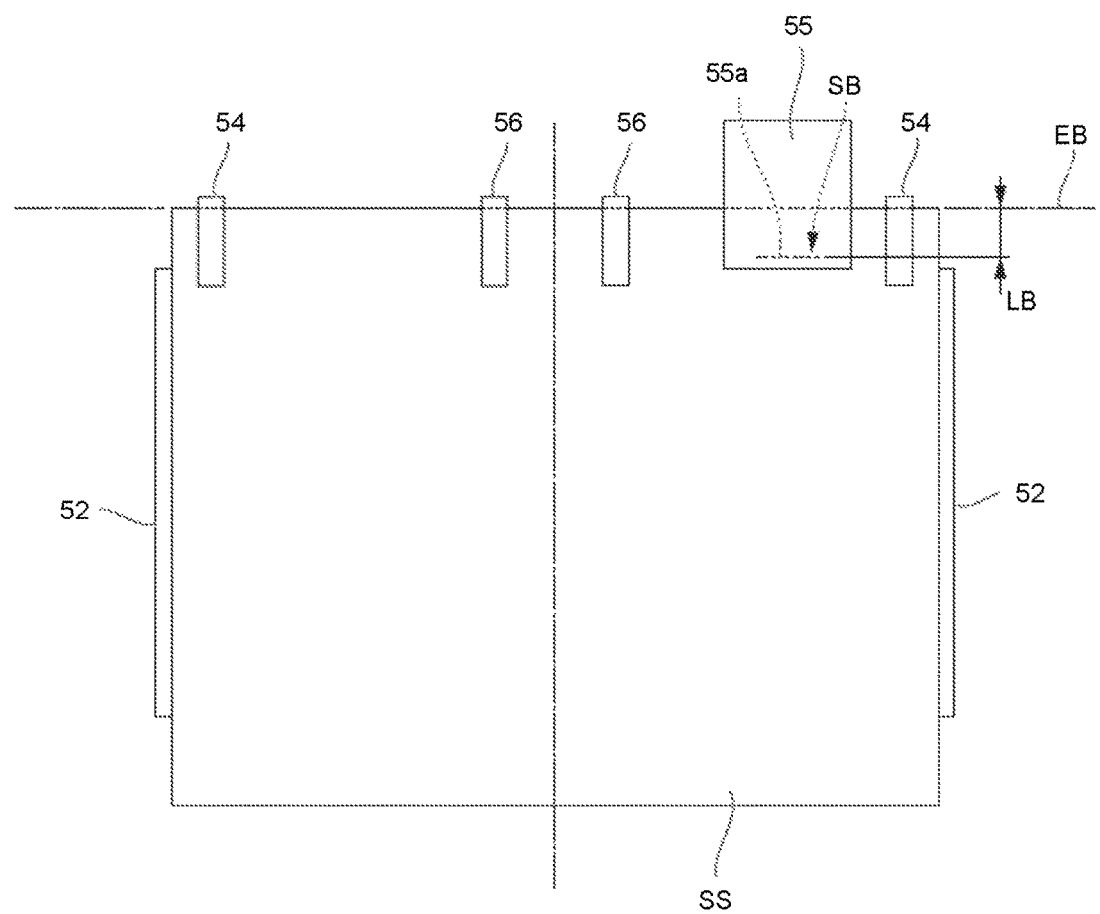
FIG. 6 is a diagram viewed from an arrow VI direction in FIG. 5.

FIG. 5 is a side view illustrating the operation state of the sheet alignment processing in the sheet processing apparatus according to an embodiment. FIG. 6 is a diagram viewed from an arrow VI direction (+Z direction) in FIG. 5. In FIG. 6, in order to make the figure easy to see, the description of the members existing in the +Z direction of the sheet bundle SS is omitted as appropriate.

The post-processing controller 25 executes the sheet alignment processing (ACT 20).

The post-processing controller 25 rotates the paddle section 45 counterclockwise (in the direction of the arrow R1) as shown in FIG. 5. The long paddle 45a of the paddle section 45 abuts against the upper surface of the sheet S at the top of the sheet bundle SS. The long paddle 45a of the paddle section 45 applies a force in the −X direction to the top sheet S. The post-processing controller 25 rotates the conveyance rollers 59a and 59b clockwise as shown in FIG. 5. The conveyance rollers 59a and 59b abut against the lower surface of the sheet S at the bottom of the sheet bundle SS. The conveyance rollers 59a and 59b apply a force in the −X direction to the sheet S at the bottom. If the sheet bundle SS contains three or more sheets S, a frictional force in the X direction is applied to the sheet S in the middle from the sheet S at the top and the sheet S at the bottom. As a result, the force in the −X direction is applied to the entire sheet bundle SS. The end in the −X direction of the sheet bundle SS falling down to the processing tray 51 is arranged away from the rear end stopper 54 in the +X direction in some cases. Even in this case, due to the force in the −X direction applied to the sheet bundle SS, the sheet bundle SS moves in the −X direction to abut against the rear end stopper 54. The post-processing controller 25 further rotates the paddle section 45 to enable the short paddle 45b to abut against the sheet bundle SS. The paddle section 45 pushes the sheet bundle SS to the rear end stopper 54 by the short paddle 45b. As a result, as shown in FIG. 6, the sheet bundle SS is aligned in the X direction.

The post-processing controller 25 moves a pair of the horizontal alignment plates 52 in the Y direction towards the sheet bundle SS. The pair of the horizontal alignment plate 52 abuts against the sheet bundle SS from the Y direction to align the sheet bundle SS in the Y direction. As a result, as shown in FIG. 6, the sheet bundle SS is aligned in the X and Y directions.

Figure 7:
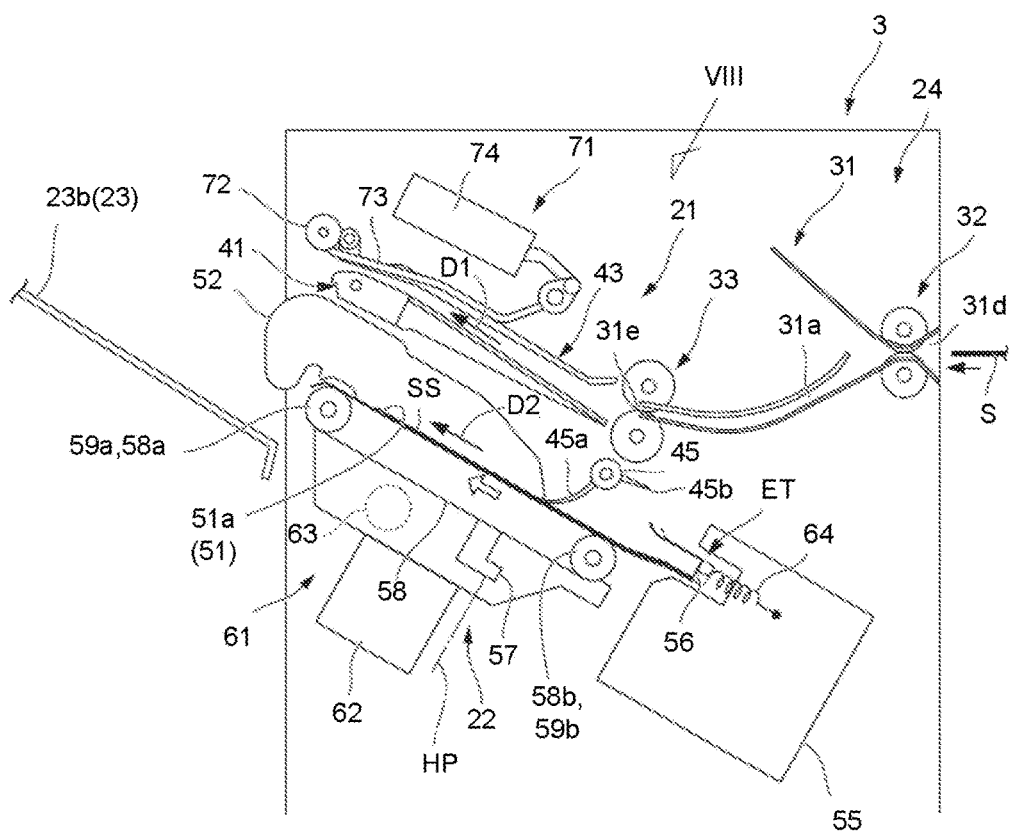
FIG. 7 is a side view illustrating an operation state of a stapling processing in the sheet processing apparatus according to an embodiment.
Figure 8:
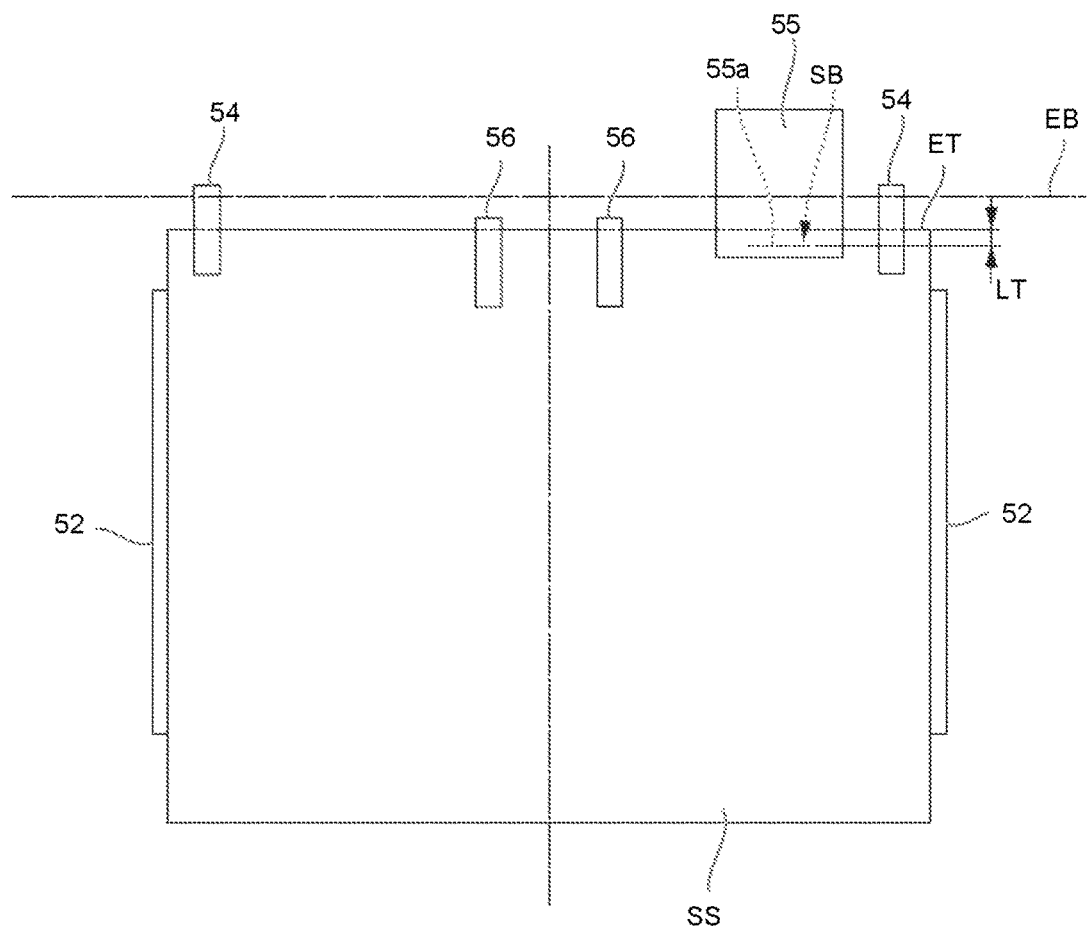
FIG. 8 is a diagram viewed from an arrow VIII direction in FIG. 7.
Figure 8:
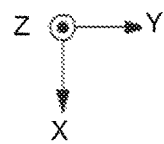

FIG. 7 is a side view illustrating the operation state of the stapling processing in the sheet processing apparatus according to an embodiment. FIG. 8 is a diagram viewed from an arrow VIII direction (+Z direction) in FIG. 7. In FIG. 8, in order to make the figure easy to see, the description of the members existing in the +Z direction of the sheet bundle SS is omitted as appropriate. FIG. 9 is an enlarged view of an IX portion in FIG. 7.

The post-processing controller 25 executes the stapling processing (ACT 30).

The post-processing controller 25 rotates the paddle section 45 counterclockwise as shown in FIG. 9. The post-processing controller 25 presses the upper surface of the sheet bundle SS of which the sheet alignment processing is completed with the long paddle 45a (ACT 32). The post-processing controller 25 arranges the long paddle 45a in the −X direction with respect to a virtual plane VS and enables the long paddle 45a to press the sheet bundle SS. The virtual plane VS is perpendicular to the conveyance surface 51a of the processing tray 51 and includes a rotation axis 45c of the paddle section 45. As a result, the long paddle 45a presses the upper surface of the sheet bundle SS in a stable position. The post-processing controller 25 holds the pair of the horizontal alignment plates 52 in a state in which the pair of the horizontal alignment plates 52 is in contact with the sheet bundle SS.

The post-processing controller 25 moves the ejector 56 in the +X direction from the reference position EB (ACT 34). The post-processing controller 25 sets the electromagnetic clutch 63 to a connected state and drives the bundle claw driving motor 62 to move the ejector 56. The post-processing controller 25 moves the ejector 56 in the +X direction by a distance obtained by subtracting the distance LT of the stapling position ST from the distance LB of the stapling standard position SB. While moving the ejector 56, the post-processing controller 25 enables the long paddle 45a to press the upper surface of the sheet bundle SS. While moving the ejector 56, the post-processing controller 25 rotates the paddle section 45 clockwise (in the arrow R2 direction) as shown in FIG. 9. As a result, the post-processing controller 25 moves the pressing position of the sheet bundle SS by the long paddle 45a in the +X direction. A moving speed of the pressing position of the sheet bundle SS by the long paddle 45a is substantially coincident with the moving speed of the ejector 56. As a result, the post-processing controller 25 moves the sheet bundle SS in the +X direction while maintaining the alignment state in the X direction. While moving the ejector 56, the post-processing controller 25 holds the pair of the horizontal alignment plates 52 in a state in which the pair of the horizontal alignment plates 52 is in contact with the sheet bundle SS. As a result, the post-processing controller 25 moves the sheet bundle SS in the +X direction while maintaining the alignment state in the Y direction.

The post-processing controller 25 stops the ejector 56 at a processing position ET (ACT 36). The processing position ET is a position where the stapling position ST of the sheet bundle SS is coincident with a driving position MT of the staple 55a by the stapler 55. The post-processing controller 25 holds the electromagnetic clutch 63 in a connected state. As a result, the post-processing controller 25 prevents the ejector 56 from returning to the reference position EB. The post-processing controller 25 holds the bundle claw driving motor 62 in an excited state. As a result, the post-processing controller 25 prevents the ejector 56 from moving in the −X direction due to the reverse rotation of the bundle claw driving motor 62 caused by the empty weight of the sheet bundle SS.

The post-processing controller 25 drives the stapler 55 to execute the stapling processing on the sheet bundle SS (ACT 38). The sheet bundle SS is supported by the ejector 56 stopped at the processing position ET. The stapling position ST of the sheet bundle SS is arranged at the driving position MT of the staple 55a by the stapler 55. As a result, the stapler 55 drives the staple 55a to the stapling position ST of the sheet bundle SS.

Figure 10:
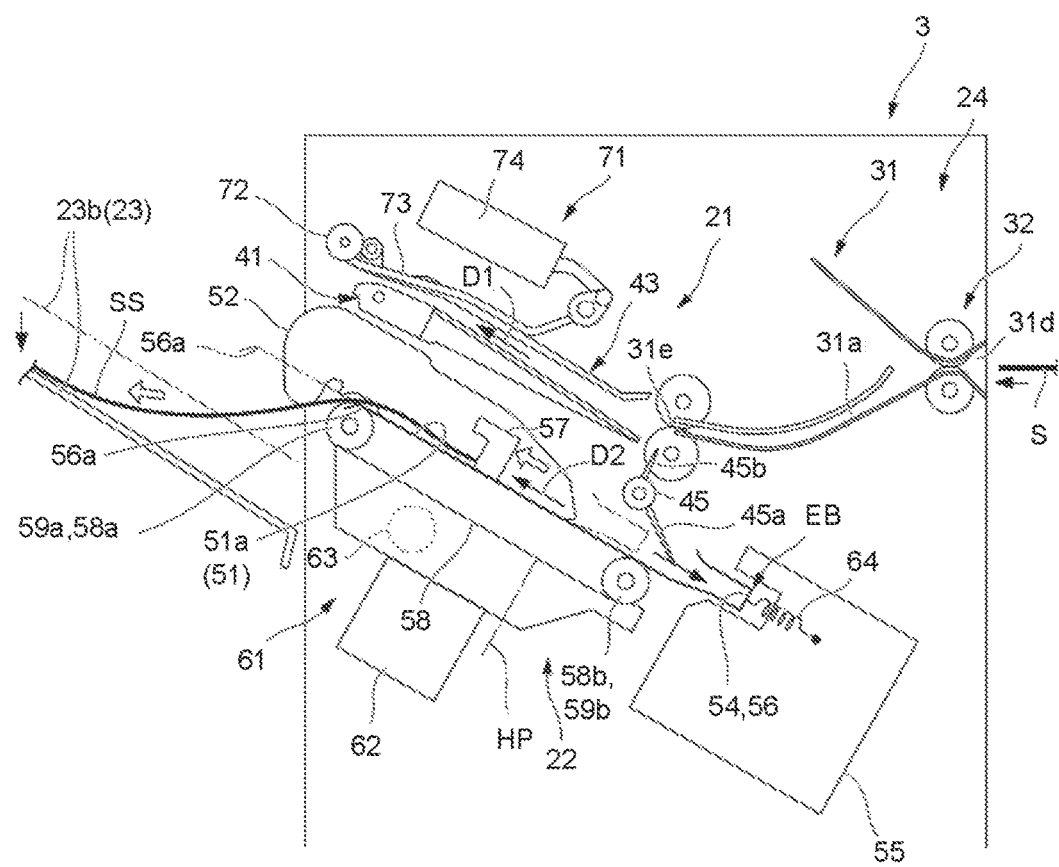
FIG. 10 is a side view illustrating a first operation state of a sheet discharge processing in a sheet processing apparatus according to an embodiment.
Figure 10:
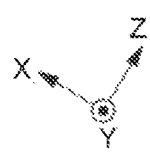
Figure 11:
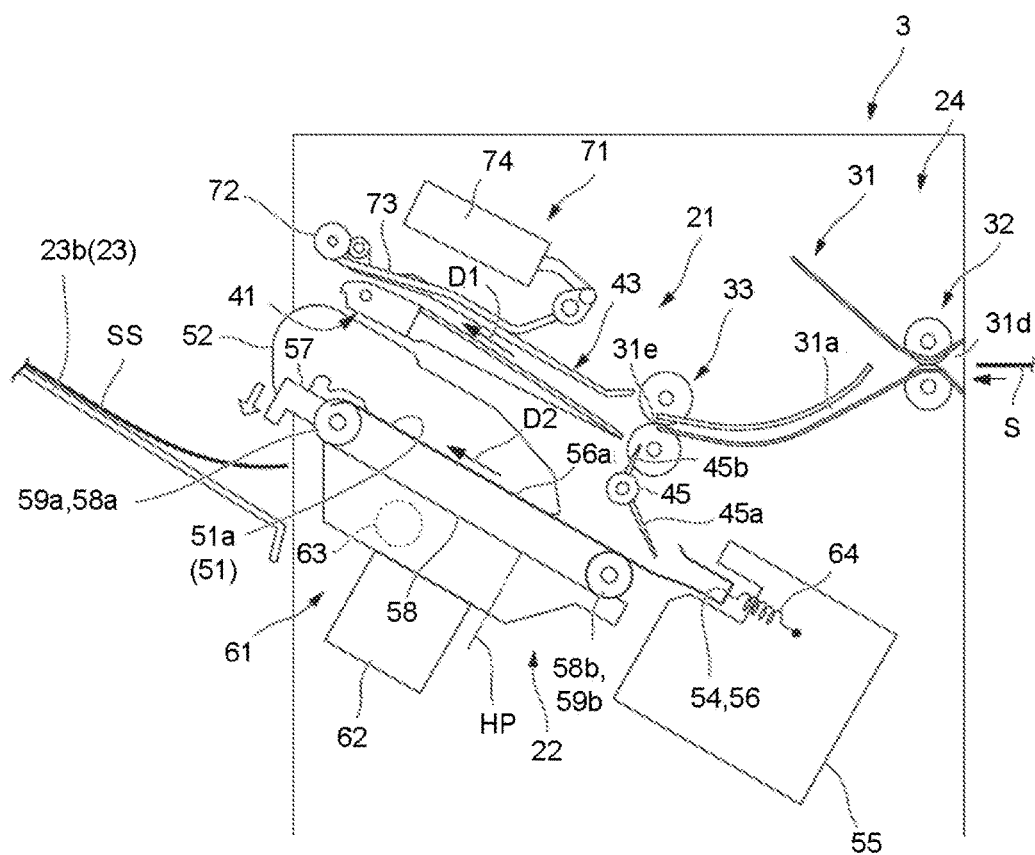
FIG. 11 is a side view illustrating a second operation state of a sheet discharge processing in the sheet processing apparatus according to an embodiment.

FIG. 10 is a side view illustrating the first operation state of the sheet discharge processing in the sheet processing apparatus according to an embodiment. FIG. 11 is a side view illustrating the second operation state of the sheet discharge processing in the sheet processing apparatus according to an embodiment.

The post-processing controller 25 executes the sheet discharge processing (ACT 40).

As shown in FIG. 10, the post-processing controller 25 rotates the paddle section 45 to move the long paddle 45a away from the upper surface of the sheet bundle SS. As a result, the post-processing controller 25 releases the pressing of the upper surface of the sheet bundle SS by the long paddle 45a. The post-processing controller 25 moves the pair of the horizontal alignment plates 52 in the Y direction to move them away from the sheet bundle SS.

The post-processing controller 25 moves the ejector 56 in the +X direction from the processing position ET (refer to FIG. 9). The post-processing controller 25 moves the ejector 56 by driving the bundle claw driving motor 62 while keeping the electromagnetic clutch 63 in a connected state. The post-processing controller 25 drives the bundle claw driving motor 62 to move the bundle claw 57. The bundle claw 57 moves from the lower surface side to the upper surface side of the processing tray 51 along with the normal rotation of the bundle claw belt 58. The bundle claw 57 moves in the +X direction at the upper surface side of the processing tray 51. If the bundle claw 57 catches up with the ejector 56, the bundle claw 57 receives the sheet bundle SS from the ejector 56. The bundle claw 57 passes the ejector 56 and conveys the sheet bundle SS alone.

As shown in FIG. 11, the post-processing controller 25 enables the ejector 56 to return to the reference position EB. The post-processing controller 25 disconnects the electromagnetic clutch 63 to block the transmission of the driving force of the bundle claw driving motor 62 to the ejector 56. Since the ejector 56 is energized towards the reference position EB by the energization member 64, the ejector 56 returns to the reference position EB.

The post-processing controller 25 further moves the bundle claw 57 in the +X direction to discharge the sheet bundle SS to the movable tray 23b. If the discharge of the sheet bundle SS is completed, the post-processing controller 25 reversely rotates the bundle claw belt 58. As a result, the post-processing controller 25 returns the bundle claw 57 to the home position HP at the lower side of the processing tray 51. The post-processing controller 25 may rotate the bundle claw belt 58 in the normal direction to enable the bundle claw 57 to return to the home position HP.

Thus, a series of processing of the sheet processing method is completed.

The post-processing controller 25 of the sheet processing apparatus 3 according to an embodiment moves the ejector 56 in the +X direction from the reference position EB (ACT 34) as shown in FIG. 9 in the stapling processing (ACT 30). The post-processing controller 25 stops the ejector 56 at the processing position ET (ACT 36). The post-processing controller 25 drives the stapler 55 to execute the stapling processing on the sheet bundle SS supported by the ejector 56 (ACT 38). As a result, the sheet processing apparatus 3 executes the stapling processing at the stapling position ST different from the stapling standard position SB. The stapling standard position SB is the position where the stapling processing is executed (the staple 55a is driven in) on the sheet bundle SS immediately after the completion of the sheet alignment processing. The sheet processing apparatus 3 executes the stapling processing at the stapling position ST in the −X direction with respect to the stapling standard position SB.

If the stapler 55 is enabled to execute the stapling processing, the post-processing controller 25 presses the upper surface of the sheet bundle SS by the long paddle 45a of the paddle section 45. As a result, the sheet processing apparatus 3 executes the stapling processing while maintaining the alignment state of the sheet bundle SS.

The post-processing controller 25 presses the upper surface of the sheet bundle SS by the long paddle 45a of the paddle section 45 while moving the ejector 56 from the reference position EB to the processing position ET. While moving the ejector 56, the post-processing controller 25 rotates the paddle section 45 to move the pressing position of the sheet bundle SS by the long paddle 45a in the +X direction. As a result, the sheet processing apparatus 3 maintains the alignment state of the sheet bundle SS in the X direction in the movement of the ejector 56.

The post-processing controller 25 arranges the long paddle 45a in the +X direction with respect to the virtual plane VS and presses the upper surface of the sheet bundle SS by the long paddle 45a. The virtual plane VS is perpendicular to the upper surface of the processing tray 51 and includes the rotation axis 45c of the paddle section 45. As a result, the sheet processing apparatus 3 holds the long paddle 45a in the stable position and presses the upper surface of the sheet bundle SS by the long paddle 45a.

While moving the ejector 56 from the reference position EB to the processing position ET, the post-processing controller 25 enables the pair of the horizontal alignment plates 52 to abut against the sheet bundle SS. As a result, the sheet processing apparatus 3 maintains the alignment state of the sheet bundle SS in the Y direction in movement of the ejector 56.

When the ejector 56 is stopped at the processing position ET, the post-processing controller 25 sets the electromagnetic clutch 63 to the connected state and sets the bundle claw driving motor 62 to the excited state. As a result, the sheet processing apparatus 3 holds the ejector 56 in a state in which the ejector 56 stops at the processing position ET.

As shown in FIG. 3, in the sheet processing apparatus 3 of an embodiment, the sheet bundle SS is supplied from the standby tray 41 to the processing tray 51. The sheet bundle SS may be supplied to the processing tray 51 by an operator.

In the sheet processing apparatus 3 of an embodiment, the stapler 55a is driven in by the stapler 55 to execute the stapling processing. The sheet processing apparatus 3 may execute the binding processing of the sheet bundle SS different from the stapling processing by a means other than the stapler 55.

The sheet processing apparatus 3 of an embodiment enables the long paddle 45a of the paddle section 45 to abut against the sheet bundle SS to align the sheet bundle SS in the X direction. In the sheet processing apparatus 3, a roller or the like may abut against the sheet bundle SS to align the sheet bundle SS in the X direction.

In an embodiment, the paddle section 45 of an embodiment has two paddles (the long paddle 45a and the short paddle 45b). The paddle section 45 may have only one paddle or three or more paddles, according to some embodiments.

In the sheet processing apparatus 3 of an embodiment, the bundle claw 57 receives the sheet bundle SS from the ejector 56 and executes the sheet discharge processing. The sheet processing apparatus 3 may execute the sheet discharge processing with only the ejector 56.

The sheet processing apparatus 3 of an embodiment drives the ejector 56 and the bundle claw 57 with the same bundle claw driving motor 62. The sheet processing apparatus 3 may drive the ejector 56 and the bundle claw 57 with separate motors.

According to at least one embodiment described above, the sheet processing apparatus 3 has the post-processing controller 25 which moves the ejector 56 to enable the stapler 55 to execute the stapling processing. As a result, the sheet processing apparatus 3 can execute the stapling processing at a position different from the standard position.

While certain embodiments have been described these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A sheet processing apparatus, comprising:
   a tray on which a sheet having an image formed thereon is stacked;
   a stapler, arranged at an upstream side in a first direction which is a sheet discharge direction with respect to the tray, configured to execute a binding processing on the sheet;
   a first discharge section configured to move from a reference position at the upstream side of the tray in the first direction while supporting the sheet, and execute a discharge processing of the sheet;
   a controller configured to cause the first discharge section to move from the reference position to a downstream side in the first direction and stop at a processing position, and to drive the stapler to execute the binding processing on the sheet supported by the first discharge section;
   a second discharge section configured to receive the sheet from the first discharge section at the downstream side of the processing position and move to the downstream side to execute the discharge processing of the sheet;
   a motor configured to drive the first discharge section and the second discharge section;
   a clutch configured to be connected to transmit a driving force from the motor to the first discharge section, and to be disconnected to block transmission of the driving force, and
   a spring configured to energize the first discharge section towards the reference position.

2. The sheet processing apparatus according to claim 1, further comprising:
   a first alignment section configured to abut against an upper surface of the sheet stacked on the tray and apply a force towards the upstream side to the sheet to align the sheet in the first direction, wherein
   when the stapler executes the binding processing, the controller is configured to press the upper surface of the sheet by the first alignment section.

3. The sheet processing apparatus according to claim 2, wherein the controller is configured to press the upper surface of the sheet with the first alignment section while moving the first discharge section from the reference position to the processing position, and operate the first alignment section to move a pressing position of the sheet by the first alignment section towards the downstream side.

4. The sheet processing apparatus according to claim 2, wherein
the first alignment section has a rotating body having a rotation axis along a second direction intersecting the first direction and a paddle extending radially from the rotating body, and
the controller is configured to position the paddle at the downstream side of a plane perpendicular to an upper face of the tray and including the rotation axis, and to press the upper surface of the sheet with the paddle.

5. The sheet processing apparatus according to claim 2, further comprising:
a second alignment section configured to abut against the sheet from two sides of the sheet in a second direction intersecting the first direction to align the sheet in the second direction, and
the controller is configured to cause the second alignment section to abut against the sheet while moving the first discharge section from the reference position to the processing position.

6. The sheet processing apparatus according to claim 1, wherein
when the first discharge section is stopped at the processing position, the controller is configured to set the clutch to a connected state and set the motor to an excited state.

7. An image forming system, comprising:
a sheet processing apparatus; and
an image forming section configured to form an image on a sheet and convey the sheet on which an image is formed to the sheet processing apparatus, the sheet processing apparatus comprising
a tray on which the sheet having the image formed thereon is stacked;
a stapler, arranged at an upstream side in a first direction which is a sheet discharge direction with respect to the tray, configured to execute a binding processing on the sheet;
a first discharge section configured to move from a reference position at the upstream side of the tray in the first direction while supporting the sheet, and execute a discharge processing of the sheet;
a controller configured to cause the first discharge section to move from the reference position to a downstream side in the first direction and stop at a processing position, and to drive the stapler to execute the binding processing on the sheet supported by the first discharge section;
a second discharge section configured to receive the sheet from the first discharge section at the downstream side of the processing position and move to the downstream side to execute the discharge processing of the sheet;
a motor configured to drive the first discharge section and the second discharge section;
a clutch configured to be connected to transmit a driving force from the motor to the first discharge section, and to be disconnected to block transmission of the driving force, and
a spring configured to energize the first discharge section towards the reference position.

8. The image forming system according to claim 7, further comprising:
a first paddle configured to abut against an upper surface of the sheet stacked on the tray and align the sheet in the first direction, wherein
when the stapler executes the binding processing, the controller is configured to press the upper surface of the sheet with the first paddle.

9. The image forming system according to claim 8, wherein
the controller is configured to cause the first paddle to press the upper surface of the sheet while the first discharge section moves from the reference position to the processing position, and to operate the first paddle to move a pressing position of the sheet towards the downstream side.

10. The image forming system according to claim 8, wherein
the controller is configured to position the first paddle at the downstream side of a plane perpendicular to an upper face of the tray.

11. A sheet processing method, comprising:
providing a tray on which a sheet having an image formed thereon is stacked;
arranging a stapler at an upstream side in a first direction which is a sheet discharge direction with respect to the tray;
causing, by a controller, a first discharge section to move from a reference position at the upstream side of the tray in the first direction while supporting the sheet, and executing discharge processing of the sheet;
causing, by the controller, the first discharge section to move to a downstream side in the first direction and stop at a processing position;
driving the stapler to execute binding processing on the sheet supported by the first discharge section;
receiving, by a second discharge section, the sheet from the first discharge section at the downstream side of the processing position, and causing the second discharge section to move to the downstream side to execute the discharge processing of the sheet;
driving, by a motor, the first discharge section and the second discharge section;
transmitting, by a clutch, a driving force from the motor to the first discharge section when the clutch is connected, and blocking transmission of the driving force when the clutch is disconnected; and
energizing the first discharge section towards the reference position by a spring.

12. The sheet processing method according to claim 11, further comprising:
positioning a first alignment section such that the first alignment section abuts against an upper surface of the sheet stacked on the tray, and applying a force towards the upstream side on the sheet to align the sheet in the first direction, and
when the stapler executes binding processing, pressing the upper surface of the sheet by the first alignment section.

13. The sheet processing method according to claim 12, further comprising:
pressing the upper surface of the sheet with the first alignment section while moving the first discharge section from the reference position to the processing position, and operating the first alignment section to move a pressing position of the sheet by the first alignment section towards the downstream side.

14. The sheet processing method according to claim 12, further comprising:
   positioning, by the controller, the first alignment section at the downstream side of a plane perpendicular to an upper face of the tray and including a rotation axis of the first alignment section, the rotation axis coinciding with a second direction and intersecting with the first direction.

15. The sheet processing method according to claim 12, further comprising:
   positioning a second alignment section to abut against the sheet from two sides of the sheet in a second direction intersecting the first direction to align the sheet in the second direction, and
   causing the second alignment section to abut against the sheet while moving the first discharge section from the reference position to the processing position.

16. The sheet processing method according to claim 14, wherein the first alignment section comprises a plurality of paddles having different lengths from the rotation axis to respective tips thereof.

\* \* \* \* \*